(12) United States Patent
Teddy et al.

(10) Patent No.: US 9,769,186 B2
(45) Date of Patent: Sep. 19, 2017

(54) DETERMINING A REPUTATION THROUGH NETWORK CHARACTERISTICS

(71) Applicant: McAfee, Inc., Santa Clara, CA (US)

(72) Inventors: John D. Teddy, Portland, OR (US); Ramnath Venugopalan, Webster, NY (US); Cedric Cochin, Portland, OR (US); Joel R. Spurlock, Portland, OR (US)

(73) Assignee: McAfee, Inc., Santa Clara, CA (US)

( * ) Notice: Subject to any disclaimer, the term of this patent is extended or adjusted under 35 U.S.C. 154(b) by 72 days.

(21) Appl. No.: 14/581,922

(22) Filed: Dec. 23, 2014

(65) Prior Publication Data

US 2016/0182538 A1 Jun. 23, 2016

(51) Int. Cl.
*H04L 29/06* (2006.01)

(52) U.S. Cl.
CPC ...... *H04L 63/1416* (2013.01); *H04L 63/1441* (2013.01); *H04L 63/102* (2013.01)

(58) Field of Classification Search
CPC .......... H04L 63/1416; H04L 63/10; H04L 63/1441; H04L 63/102
USPC .......................................................... 726/23
See application file for complete search history.

(56) References Cited

U.S. PATENT DOCUMENTS

| | | | |
|---|---|---|---|
| 5,566,877 A * | 10/1996 | McCormack | G01N 21/8803 228/105 |
| 5,987,610 A | 11/1999 | Franczek et al. | |
| 6,073,142 A | 6/2000 | Geiger et al. | |
| 6,460,050 B1 | 10/2002 | Pace et al. | |
| 6,502,131 B1 * | 12/2002 | Vaid | H04L 1/1854 709/224 |
| 6,567,822 B1 * | 5/2003 | Cudahy | G06Q 10/00 |
| 6,816,903 B1 * | 11/2004 | Rakoshitz | H04L 12/2602 370/230 |
| 7,296,288 B1 * | 11/2007 | Hill | H04L 41/0896 713/194 |
| 7,506,155 B1 | 3/2009 | Stewart et al. | |
| 9,171,151 B2 * | 10/2015 | Behrendt | G06F 21/552 |
| 2004/0049699 A1 * | 3/2004 | Griffith | H04L 63/1408 726/23 |
| 2006/0178918 A1 * | 8/2006 | Mikurak | G06Q 10/06 705/7.25 |
| 2006/0277259 A1 | 12/2006 | Murphy et al. | |
| 2007/0233509 A1 * | 10/2007 | Buchman | G01R 31/2836 324/600 |
| 2008/0112596 A1 * | 5/2008 | Rhoads | G06K 9/00577 382/115 |

(Continued)

FOREIGN PATENT DOCUMENTS

KR 10-2013-0116418 A 10/2013

OTHER PUBLICATIONS

International Search Report and Written Opinion in International Application No. PCT/US2015/062811, mailed on Mar. 7, 2016, 10 pages.

*Primary Examiner* — David Garcia Cervetti
(74) *Attorney, Agent, or Firm* — Patent Capital Group

(57) ABSTRACT

Particular embodiments described herein provide for an electronic device that can be configured to monitor network traffic to and from a device, compare the monitored network traffic to characteristics of the device to determine if the monitored traffic is outside the characteristics of the device, and take remedial action if the monitored traffic is outside the characteristics of the device.

18 Claims, 9 Drawing Sheets

(56) References Cited

U.S. PATENT DOCUMENTS

| | | | | |
|---|---|---|---|---|
| 2008/0221918 A1* | 9/2008 | Petersen | G06Q 50/22 | 705/2 |
| 2009/0144007 A1* | 6/2009 | Moreira | G01R 31/31707 | 702/81 |
| 2009/0307748 A1* | 12/2009 | Blom | G06F 21/31 | 726/2 |
| 2010/0082987 A1* | 4/2010 | Thom | G06F 21/34 | 713/171 |
| 2011/0196715 A1* | 8/2011 | Matkowsky | G06Q 30/02 | 705/7.29 |
| 2011/0238826 A1* | 9/2011 | Carre | H04L 41/5009 | 709/224 |
| 2012/0029718 A1* | 2/2012 | Davis | G05B 15/02 | 700/295 |
| 2012/0174219 A1 | 7/2012 | Hernandez et al. | | |
| 2012/0254972 A1* | 10/2012 | Fulton | G06F 21/57 | 726/9 |
| 2013/0091570 A1* | 4/2013 | McCorkendale | G06F 21/56 | 726/23 |
| 2013/0097709 A1 | 4/2013 | Basavapatna et al. | | |
| 2013/0111211 A1* | 5/2013 | Winslow | H04L 9/3234 | 713/171 |
| 2013/0194944 A1* | 8/2013 | Soyak | H04W 16/14 | 370/252 |
| 2013/0298242 A1 | 11/2013 | Kumar et al. | | |
| 2014/0056599 A1* | 2/2014 | Spink | G03G 15/55 | 399/12 |
| 2014/0317734 A1* | 10/2014 | Valencia | G06F 21/552 | 726/22 |
| 2015/0067816 A1* | 3/2015 | Rados | H04L 63/20 | 726/11 |
| 2015/0089566 A1* | 3/2015 | Chesla | H04L 63/20 | 726/1 |
| 2016/0042154 A1* | 2/2016 | Goldberg | G06F 19/327 | 705/2 |
| 2016/0080520 A1* | 3/2016 | Wang | H04L 67/303 | 709/204 |
| 2016/0197781 A1* | 7/2016 | Smith | H04L 41/0806 | 370/254 |

* cited by examiner

| 132 | 134 | 136 | 138 | 140 | 142 | 144 |
|---|---|---|---|---|---|---|
| DEVICE | UPLOAD DATA ALLOWED | DOWNLOAD DATA ALLOWED | PORT PROBING ALLOWED | AUTHORIZED DATA TYPE | PORT ALLOWED | AUTHORIZED WEBSITES ALLOWED |
| LAPTOP | YES | YES | NO | ALL | ANY | KNOWN SAFE |
| TOASTER | NO | YES | NO | UDP/TCP | 53, 80, 443 | OEM SITE ONLY |
| MEDIA PLAYER | YES | YES | NO | UDP/TCP | ANY | OEM AND CONTENT PROVIDER ONLY |
| THERMOSTAT | NO | YES | NO | UDP/TCP | 53, 80, 443 | OEM SITE ONLY |
| DESKTOP | YES | YES | NO | ALL | ANY | ALL |
| ROUTER | YES | YES | YES | ALL | ANY | ALL |

DETERMINING A REPUTATION THROUGH NETWORK CHARACTERISTICS

TECHNICAL FIELD

This disclosure relates in general to the field of information security, and more particularly, to determining a reputation through network characteristics.

BACKGROUND

The field of network security has become increasingly important in today's society. The Internet has enabled interconnection of different computer networks all over the world. In particular, the Internet provides a medium for exchanging data between different users connected to different computer networks via various types of client devices. While the use of the Internet has transformed business and personal communications, it has also been used as a vehicle for malicious operators to gain unauthorized access to computers and computer networks and for intentional or inadvertent disclosure of sensitive information.

Malicious software ("malware") that infects a host computer may be able to perform any number of malicious actions, such as stealing sensitive information from a business or individual associated with the host computer, propagating to other host computers, and/or assisting with distributed denial of service attacks, sending out spam or malicious emails from the host computer, etc. Hence, significant administrative challenges remain for protecting computers and computer networks from malicious and inadvertent exploitation by malicious software and devices.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 2 is a simplified diagram of example details of a communication system for the determination of a reputation through network characteristics in accordance with an embodiment of the present disclosure;

The FIGURES of the drawings are not necessarily drawn to scale, as their dimensions can be varied considerably without departing from the scope of the present disclosure.

DETAILED DESCRIPTION OF EXAMPLE EMBODIMENTS

Example Embodiments

Figure 1A:
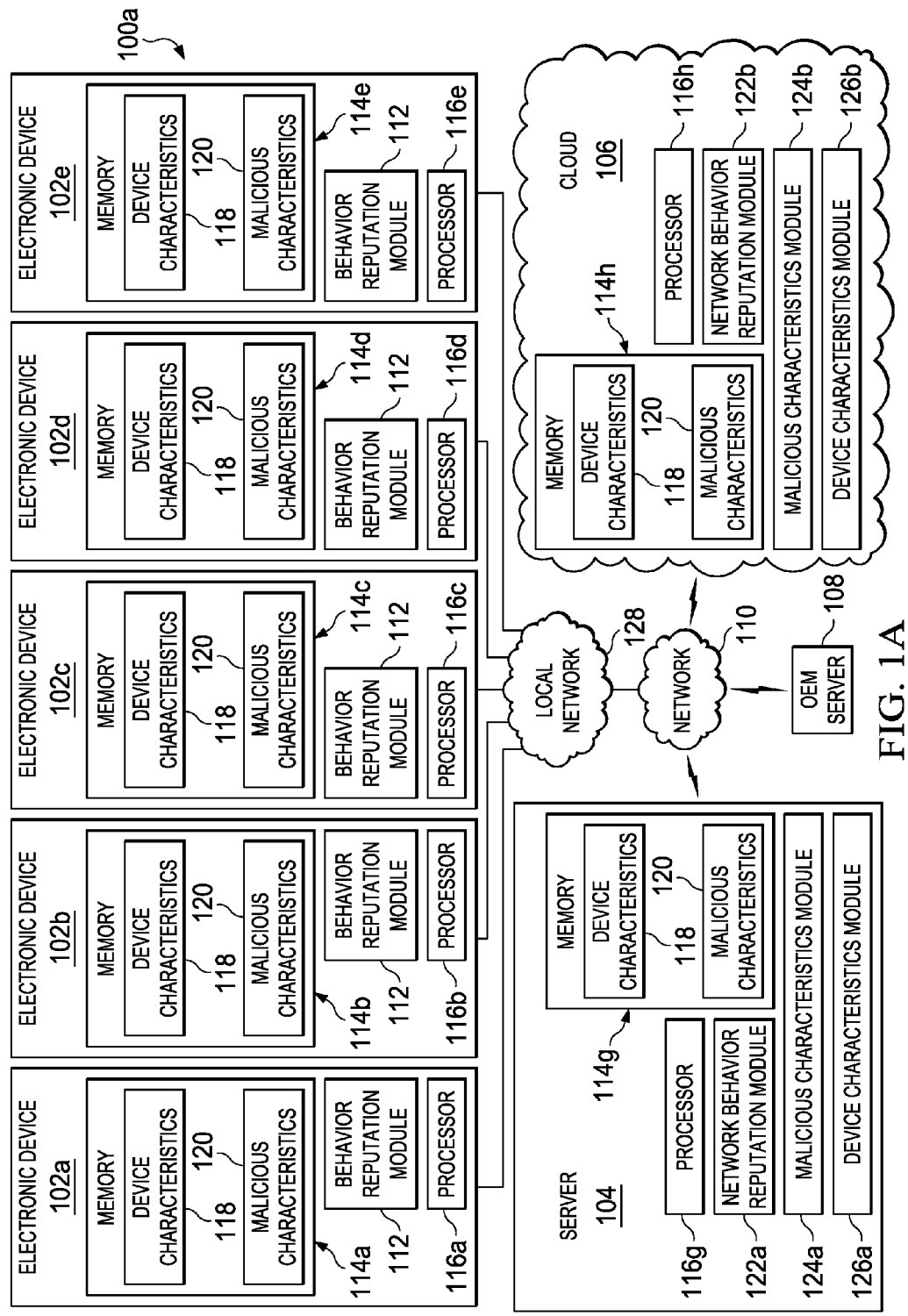
FIG. 1A is a simplified block diagram of a communication system for the determination of a reputation through network characteristics in accordance with an embodiment of the present disclosure.

FIG. 1A is a simplified block diagram of a communication system 100a for determination of a reputation through network characteristics in accordance with an embodiment of the present disclosure. As illustrated in FIG. 1A, an embodiment of communication system 100a can include electronic devices 102a-102e, a server 104, a cloud 106, and an OEM server 108. Each electronic device 102a-102e can include a behavior reputation module 112, memory 114a-e respectively and a processor 116a-e respectively. Each memory 114a-e can include device characteristics 118 and malicious characteristics 120. Server 104 can include memory 114g, a processor 116g, a network behavior reputation module 122a, a malicious characteristics module 124a, and a device characteristics module 126a. Memory 114g can include device characteristics 118 and malicious characteristics 120. Cloud 106 can include memory 114h, a processor 116h, a network behavior reputation module 122b, a malicious characteristics module 124b, and a device characteristics module 126b. Memory 114h can include device characteristics 118 and malicious characteristics 120. Electronic devices 102a-102e may be in communication using local network 128.

Figure 1B:
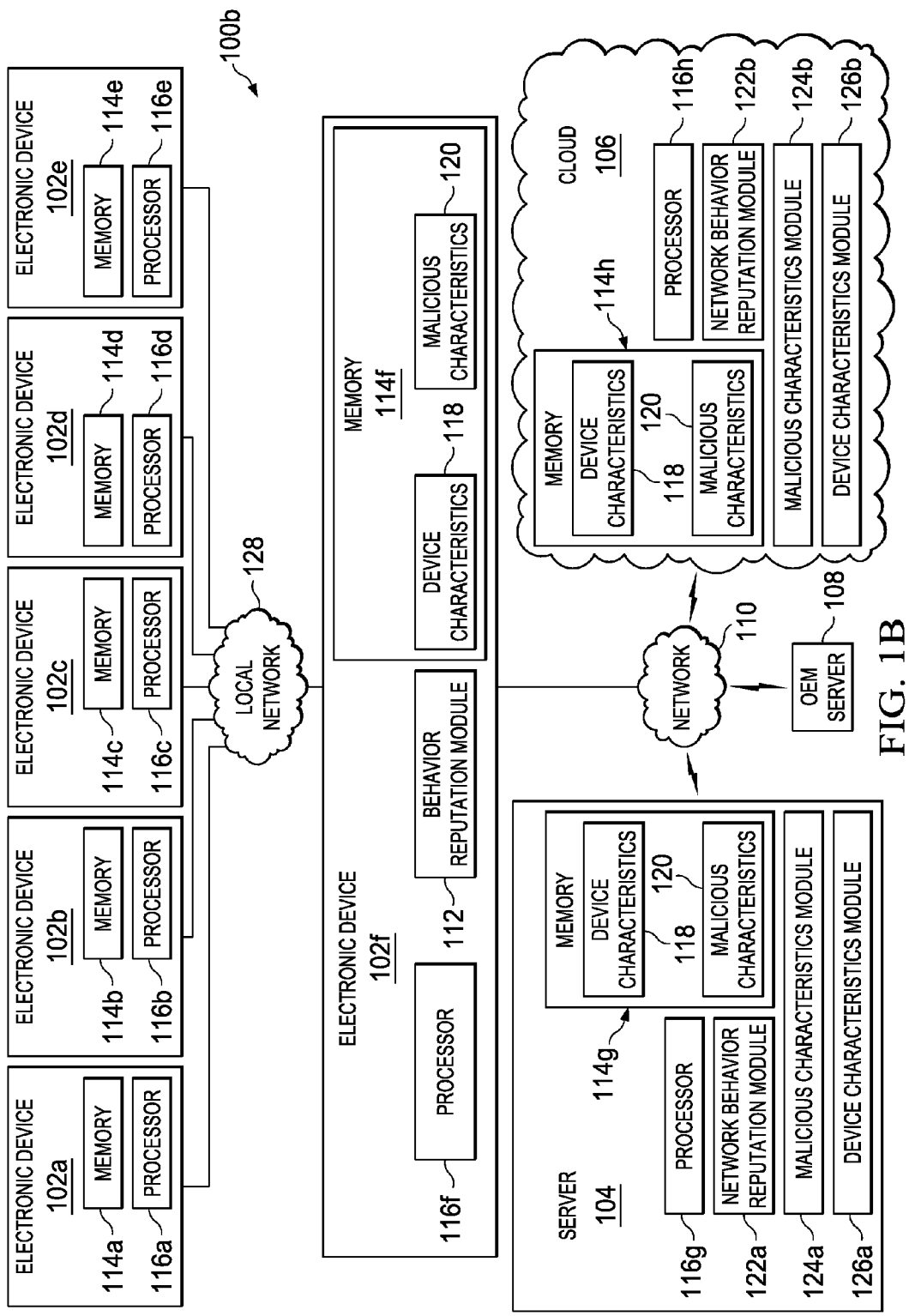
FIG. 1B is a simplified block diagram of a portion of a communication system for the determination of a reputation through network characteristics in accordance with an embodiment of the present disclosure.

FIG. 1B is a simplified block diagram of a communication system 100b for reputation determination through network characteristics in accordance with an embodiment of the present disclosure. As illustrated in FIG. 1B, an embodiment of communication system 100b can include electronic devices 102a-102f, server 104, cloud 106, and OEM server 108. In contrast to communication system 100a illustrated in FIG. 1A, electronic devices 102a-102e in communication system 100b do not include a behavior reputation module 112 and memory 114a-e does not include device characteristics 118 and malicious characteristics 120. An electronic device 102f can be configured as a central hub (e.g., router or switch) for the communications between electronic devices 102a-102e in local network 128. Electronic device 102f can include behavior reputation module 112, memory 114f, and a processor 116f. Communication system 100a and 100b are shown for example purposes only and any number of electronic devices may be included in communication system 100a and 100b and each electronic device can include behavior reputation module 112, device characteristics 118, and malicious characteristics 120.

In example embodiments, communication system 100a (and 100b) can be configured for determination of a reputation through network characteristics in accordance with an embodiment of the present disclosure. Behavior reputation module 112 can be configured to monitor network traffic and to discern good behavior from bad and thereby assessing a device reputation value for each device on the network. A device profile (e.g., device characteristics 118) and a malicious profile (e.g., malicious characteristics 120) can be used by behavior reputation module 112 to analyze traffic to and from each device and to generate a reputation based on the network traffic. The system can use passive network monitoring to be able to build a device reputation and thereby control the security of devices on the network. Malicious characteristics modules 124a and 124b can analyze know malicious behavior and populate malicious characteristics 120. Device characteristics modules 126a and 126b can obtain device characterizes for one or more electronic devices 102a-102f from OEM server 108 and from the previous activities of each electronic device. OEM server 108 may include allowed device characteristics for one or more electronic devices 102a-102f. While OEM server 108 is illustrated as a single server or network element, OEM server 108 may be a plurality of network elements where device characteristics for one or more electronic devices 102a-102f can be located.

Elements of FIG. 1 may be coupled to one another through one or more interfaces employing any suitable connections (wired or wireless), which provide viable pathways for network (e.g., network 110, local network 128, etc.) communications. Additionally, any one or more of these elements of FIG. 1 may be combined or removed from the architecture based on particular configuration needs. Communication system 100a and 100b may include a configuration capable of transmission control protocol/Internet protocol (TCP/IP) communications for the transmission or reception of packets in a network. Communication system 100a and 100b may also operate in conjunction with a user datagram protocol/IP (UDP/IP) or any other suitable protocol where appropriate and based on particular needs.

For purposes of illustrating certain example techniques of communication system 100a (and 100b), it is important to understand the communications that may be traversing the network environment. The following foundational information may be viewed as a basis from which the present disclosure may be properly explained.

Currently, the various concepts around device reputation have been reliant on having a presence on the device, thereby limiting its application to only such devices. In addition, if a presence is on the device, the reputation is often static and does not account for data to and from the device and network characteristics. What is needed is a way to be able to understand and monitor the behavior of increasingly intelligent and network connected devices. It would be beneficial if the reputation of connected devices could be determined without having a presence on the device.

A communication system for determining a reputation of a device through network characteristics, as outlined in FIGS. 1A and 1B, can resolve these issues (and others). Communication system 100a and 100b may be configured to understand the behavior of connected intelligent devices and assess a device reputation value for each device on the network. The system can be configured to identify a suspicious application or activity based on the content in network traffic associated with the application or activity. For example, the system may look for peer-to-peer (P2P) or command-and-control (C&C) traffic that could be indicative of a misbehaving device. Communication system 100b can be configured to understand the behavior of connected intelligent devices and assess a device reputation value for each device on the network without a presence on each device. If a presence is on a device, the network traffic to and from the device can be monitored and used to dynamically determine a reputation for the device. In addition, communication system 100b can leverage network characteristics of the traffic being seen by an electronic device (e.g., electronic device 102f) configured to act as a central gateway, router, or other device that has the ability to sniff traffic on the network. The electronic device can also include a behavior reputation module that can be configured to discern good behavior from bad A device profile (e.g., device characteristics 118) and a malicious profile (e.g., malicious characteristics 120) can be used to analyze traffic to and from a device. Traffic falling outside a device's profile could result in a temporary drop in that device's reputation until the traffic is either assessed to be normal or remedial action is taken. The drop in the device's reputation could have various degrees of effect, for example, allowing the device to access only trusted sites and known trusted IP addresses with a high trust reputation or to completely quarantine the device and not allow the device any network access. The reputation of the device can be at least partially determined by the reputation of the IP addresses and URLs in communication with the device. The IP addresses and URLs in communication with the device could also be used to assist in access restriction and control.

In an embodiment, the system can be configured to passively listening to the network traffic and monitoring the network traffic going to and from each electronic device. In an example, one or more electronic devices in a network (e.g. electronic devices 102a-102e) could each include a behavior reputation module 122 to monitor the network traffic and to provide alerts based on the network traffic going to and from each electronic device. In another example, a central network gateway device (e.g., electronic device 102f) could use behavior reputation module 122 to monitor the traffic and to automatically act on suspicious behavior in addition to providing information alerts. The central network gateway device could leverage network characteristics to inform device reputation assessments, thereby not requiring a presence on the device and thus being able to assess device reputation on legacy and closed devices. The system could also use the consistency of human behavior (PCs typically turned on at similar times during a week) to be able to perform anomaly detection on traffic to or from a device.

Device discovery in the network could rely on passive network monitoring for device discovery and to look for any new device that may announces itself on the network. Using various protocols, the system could be able to identify the type of device (e.g., thermostats, cameras, Blu-ray player, refrigerator, etc.). Device identification may also rely on a MAC addresses to identify the device. Monitoring address resolution Protocol (ARP) broadcasts on the network can also allow they system to understand when a new device appears on the network.

Once a device is discovered, the system can be configured to understanding how the device typically behaves based on the size, frequency, application, protocol, etc. of the network traffic to and from the device. The process could also involve storing a profile of the device in a cloud or server. This would also allow multiple electronic devices on the same network to update the profile of other devices on the network. For example, P2P and C&C traffic may be identified by means of application signatures running on the content of the network traffic. IPS signatures can be used to identify known attacks using IPS signatures. Reputation and content monitoring may be used to understand the overall reputation of the IP addresses and URLs being visited by a device.

Alerts about suspicious behavior can be sent to a user or an administrator by means of a text message, an app on a smartphone, a pop up on a screen, etc. The user or administrator can take remedial action based on the content of the alert. In one example, a network gateway device can be configured to performed remedial action automatically by means of reduced access, network quarantine, etc.

Turning to the infrastructure of FIG. 1, communication systems 100a and 100b in accordance with an example embodiment is shown. Generally, communication systems 100a and 100b can be implemented in any type or topology of networks. Network 110 represents a series of points or nodes of interconnected communication paths for receiving and transmitting packets of information that propagate through communication systems 100a and 100b. Network 110 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication. Local network 128 represents a series of points or nodes of interconnected communication paths for receiving and transmitting packets of information that propagate through electronic devices 102a-102f. Local network 128 offers a communicative interface between nodes, and may be configured as any local area network (LAN), virtual local area network (VLAN), and any other appropriate architecture or system that facilitates communications in a network environment, or any suitable combination thereof, including wired and/or wireless communication.

In communication systems 100a and 100b, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in communication systems 100a and 100b. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, electronic devices 102a-f, server 104, and cloud 106 are network elements, which are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with communication systems 100a and 100b, each of electronic devices 102a-f, server 104, and cloud 106 can include memory elements (e.g., memory 114a-114h) for storing information to be used in the operations outlined herein. Each of electronic devices 102a-f, server 104, and cloud 106 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication systems 100a and 100b could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements of communication systems 100a and 100b, such as electronic devices 102a-f, server 104, and cloud 106 may include software modules (e.g., behavior reputation module 112, network behavior reputation module 122a and 122b, malicious characteristics module 124a and 124b, and device characteristics module 126a and 126b) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of electronic devices 102a-f, server 104, and cloud 106 may include a processor that can execute software or an algorithm to perform activities as discussed herein. A processor (e.g., processor 116a-116h) can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Electronic devices 102a-f can each be a network element and includes, for example, desktop computers, laptop computers, mobile devices, personal digital assistants, smartphones, tablets, or other similar devices. Server 104 can be a network element such as a server or virtual server and can be associated with clients, customers, endpoints, or end users wishing to initiate a communication in communication systems 100a and 100b via some network (e.g., network 110). The term 'server' is inclusive of devices used to serve the requests of clients and/or perform some computational task on behalf of clients within communication systems 100a and 100b. Although behavior reputation module 112 is represented in FIG. 1A as being located in one or more electronic devices 102a-e and in FIG. 1B as being location in electronic device 102f, this is for illustrative purposes only. Behavior reputation module 112 could be combined or separated in any suitable configuration. Furthermore, behavior reputation module 112 could be integrated with or distributed in another network accessible by electronic devices 102a-f such as server 104 or cloud 106. Cloud 106 is configured to provide cloud services to electronic devices 102a-f. Cloud services may generally be defined as the use of computing resources that are delivered as a service over a network, such as the Internet. Typically, compute, storage, and network resources are offered in a cloud infrastructure, effectively shifting the workload from a local network to the cloud network.

Turning to FIG. 2, FIG. 2 is a simplified block diagram of a portion of a communication system 100a and 100b for the determination of a reputation through network characteristics in accordance with an embodiment of the present disclosure. FIG. 2 illustrates an example operation of device characteristics (e.g., device characteristics 118) that can be used to analyze traffic to and from a device. Traffic falling outside of a device's characteristics could result in a drop in that device's reputation. Behavior reputation module 112 (not shown) can monitor the traffic to and from a specific electronic device and determine if the monitored traffic is outside the acceptable behaviors of the device as listed in the device characteristics.

Figure 3:
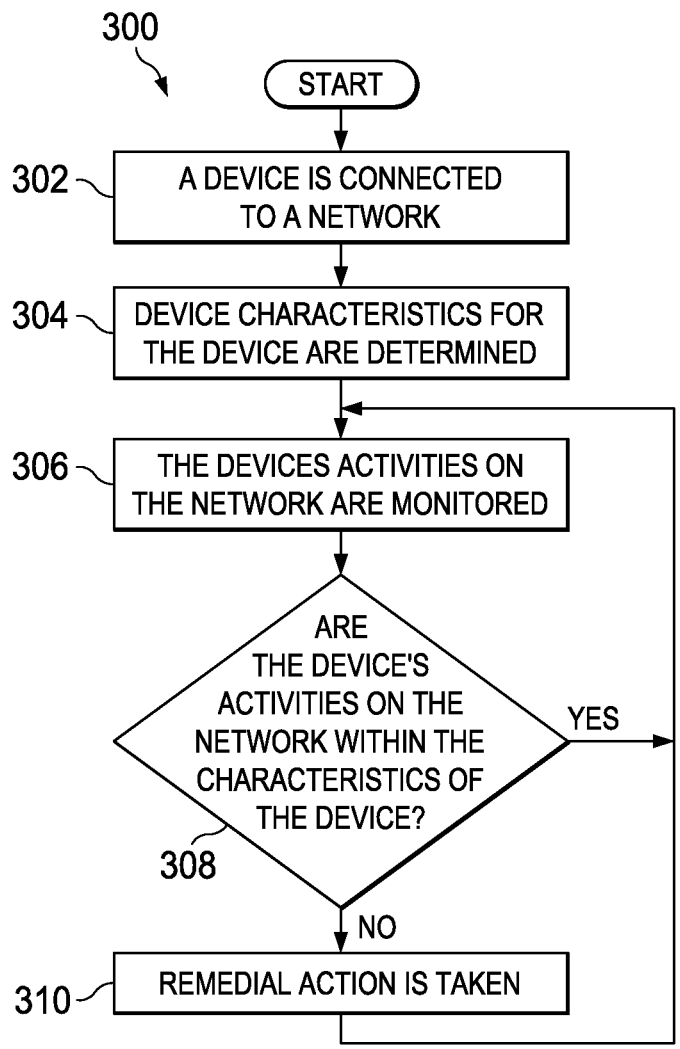
FIG. 3 is a simplified flowchart illustrating potential operations that may be associated with the communication system in accordance with an embodiment.

For illustrative example purposes, device characteristics 118 is shown to include a device column 132, a upload data allowed column 134, a download data allowed column 136, a port probing allowed column 138, an authorized data type for the device column 140, a port allowed column 142, and an authorized websites allowed column 144. One or more of the illustrated columns can be removed from device characteristics 118, other columns can be added to device characteristics 118 or any combination thereof and the illustrated columns are for examples purposes only. Electronic devices 102a-102f may correspond to the device illustrated in device column 132. For example, electronic device 102a may be a laptop, electronic device 102b may be a toaster, electronic device 102c may be a media player such as a set top box or DVD player, electronic device 102d may be a networked thermostat, electronic device 102e may be a desktop computer, and electronic device 102f may be a router. Device characteristics 118 can include the type of network activity that is allowed for each device. When a device acts outside the allowed characteristics, then some type of remedial action may be taken to try and prevent or mitigate malicious activity by the device. For example, the remedial action can include assigning an untrusted reputation to the device, removing the device from the network, reconfiguring the device, allowing only limited access to a network or restricting network access for the device, scanning the device for malware, etc Turning to FIG. 3, FIG. 3 is an example flowchart illustrating possible operations of a flow 300 that may be associated with the determination of a reputation through network characteristics, in accordance with an embodiment. In an embodiment, one or more operations of flow 300 may be performed by behavior reputation module 112. At 302, a device is connected to a network. At 304, device characteristics for the device are determined. At 306, the device's activities on the network are monitored. At 308, the system determines if the device activities on the network are within the characteristics of the device. If the device's activates on the network are within the characteristics of the device, then the devices activities on the network continue to be monitored, as in 306. If the device's activities on the network are not within the characteristics of the device, then remedial action is taken, as in 310. The remedial action can include assigning an untrusted reputation to the device, removing the device from the network, reconfiguring the device, allowing only limited access to a network or restricting network access for the device, scanning the device for malware, etc.

Figure 4:
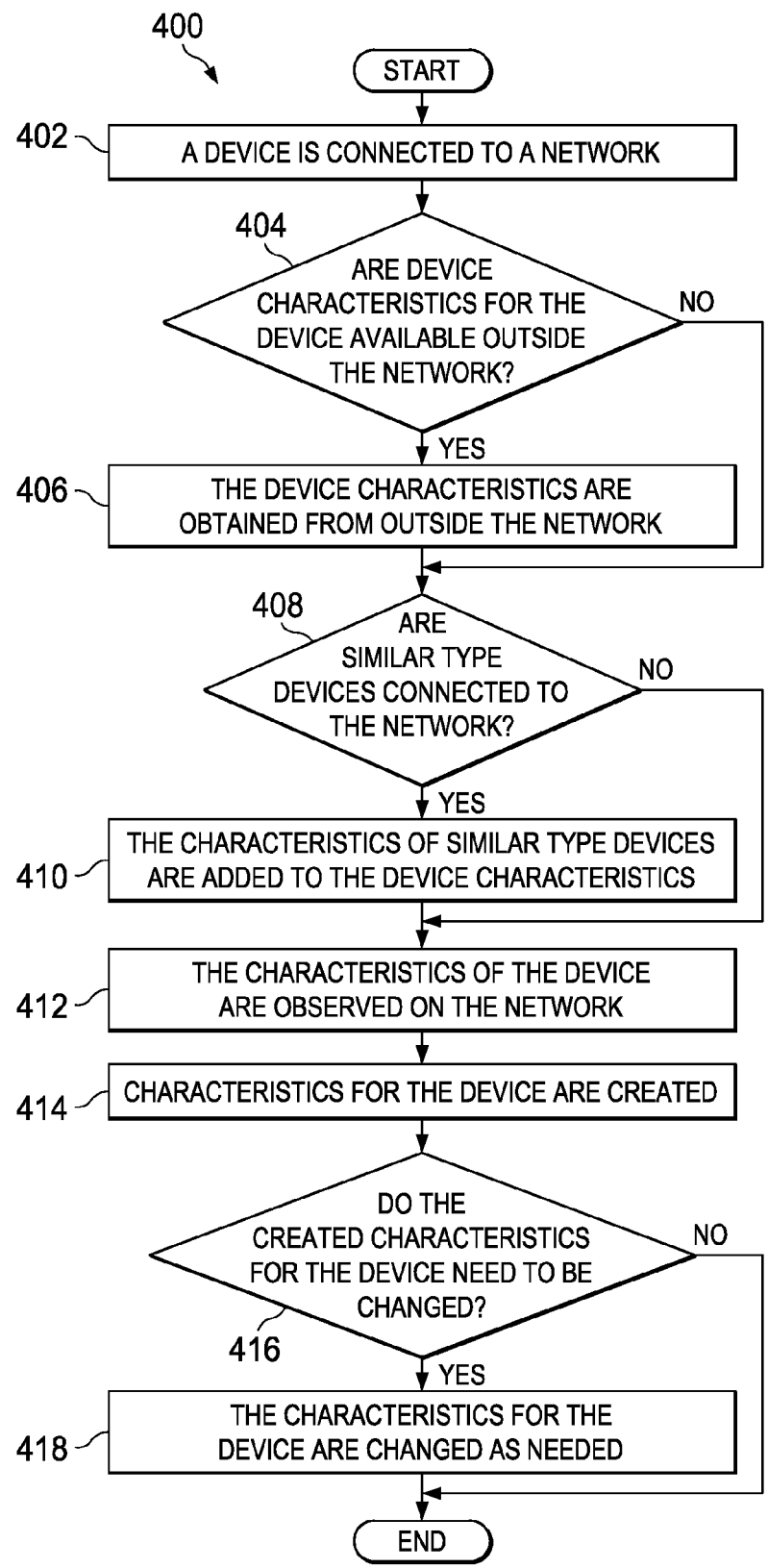
FIG. 4 is a simplified flowchart illustrating potential operations that may be associated with the communication system in accordance with an embodiment.

Turning to FIG. 4, FIG. 4 is an example flowchart illustrating possible operations of a flow 400 that may be associated with the determination of a reputation through network characteristics, in accordance with an embodiment. In an embodiment, one or more operations of flow 400 may be performed by behavior reputation module 112. At 402, a device is connected to a network. At 404, the system determines if device characteristics for the device are available from outside the network. If the device characteristics for the device are available from outside the network, then the device characteristics are obtained from outside the network, as in 406. For example, the device characteristics may be available from OEM server 108, from server 104, or cloud 106 (e.g., device characteristics module 126a in server 104 may have created the device characteristics). At 408, the system determines if similar type devices are connected to the network. Going back to 404, if the device characteristics for the device are not available from outside the network, then the system determines if similar type devices are connected to the network, as in 408. If similar type devices are connected to the network, then the characteristics of the similar type devices are added to the device characteristics, as in 410. At, 412, the characteristics of the device are observed on the network. If the device characteristics for the device are not available from outside the network, then the characteristics of the device are observed on the network, as in 412. At 414, characteristics for the device are created. At 416, the system determines if the created characteristics need to be changed. For example, a new security policy may be implemented in the network or the device's role in the network may have changed (e.g., a user's laptop may have been passed down to a child of the user). If the created characteristics for the device need to be changed, then the characteristics for the device are changed as needed, as in 418. If the created characteristics do not need to be changed, then the flow ends.

Figure 5:
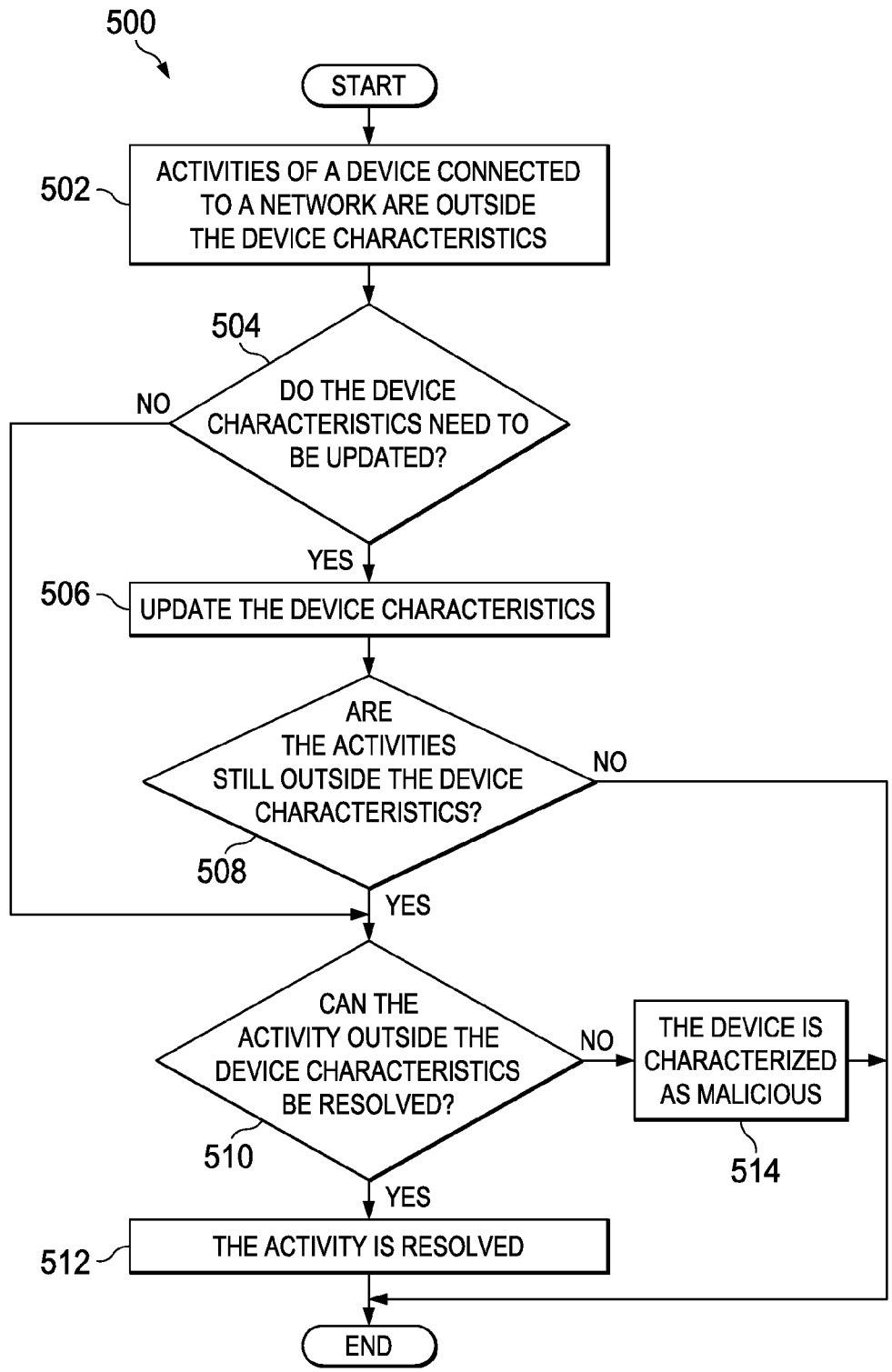
FIG. 5 is a simplified flowchart illustrating potential operations that may be associated with the communication system in accordance with an embodiment.

Turning to FIG. 5, FIG. 5 is an example flowchart illustrating possible operations of a flow 500 that may be associated with the determination of a reputation through network characteristics, in accordance with an embodiment. In an embodiment, one or more operations of flow 500 may be performed by behavior reputation module 112. At 502, activities of a device connected to a network are outside the device characteristics. At 504, the system determines if the device characteristics need to be updated. For example, a device that was used to only connect to a limited number of web sites may now be used as a primary web browsing device or, a device may have been upgraded with new features that caused the device to have characteristics that are outside the current characteristics for the device. If the device characteristics need to be updated, then the device characteristics are updated, as in 506. At 508, the system determines if the activates are still outside the device characteristics. If the activities are now not outside the device characteristics, then the flow ends. If the activates are still outside the device characteristics, then the system determines if the activity outside the device characteristics can be resolved, as in 510. Going back to 504, if the device characteristics do not need to be updated, then the system determines if the activity outside the device characteristics can be resolved, as in 510. If the activity outside the device characteristics cannot be resolved, then the device is characterized as malicious. For example, if a device is uploading sensitive information and that is outside the device's characteristics, then the device may be characterized as malicious and access to and from the device may be restricted or stopped. If the activity outside the device characteristics can be resolved, then the activity is resolved. For example, the device may be accessing a port that is outside the device's characteristics and the activity may be resolved by reconfiguring the device.

Figure 6:
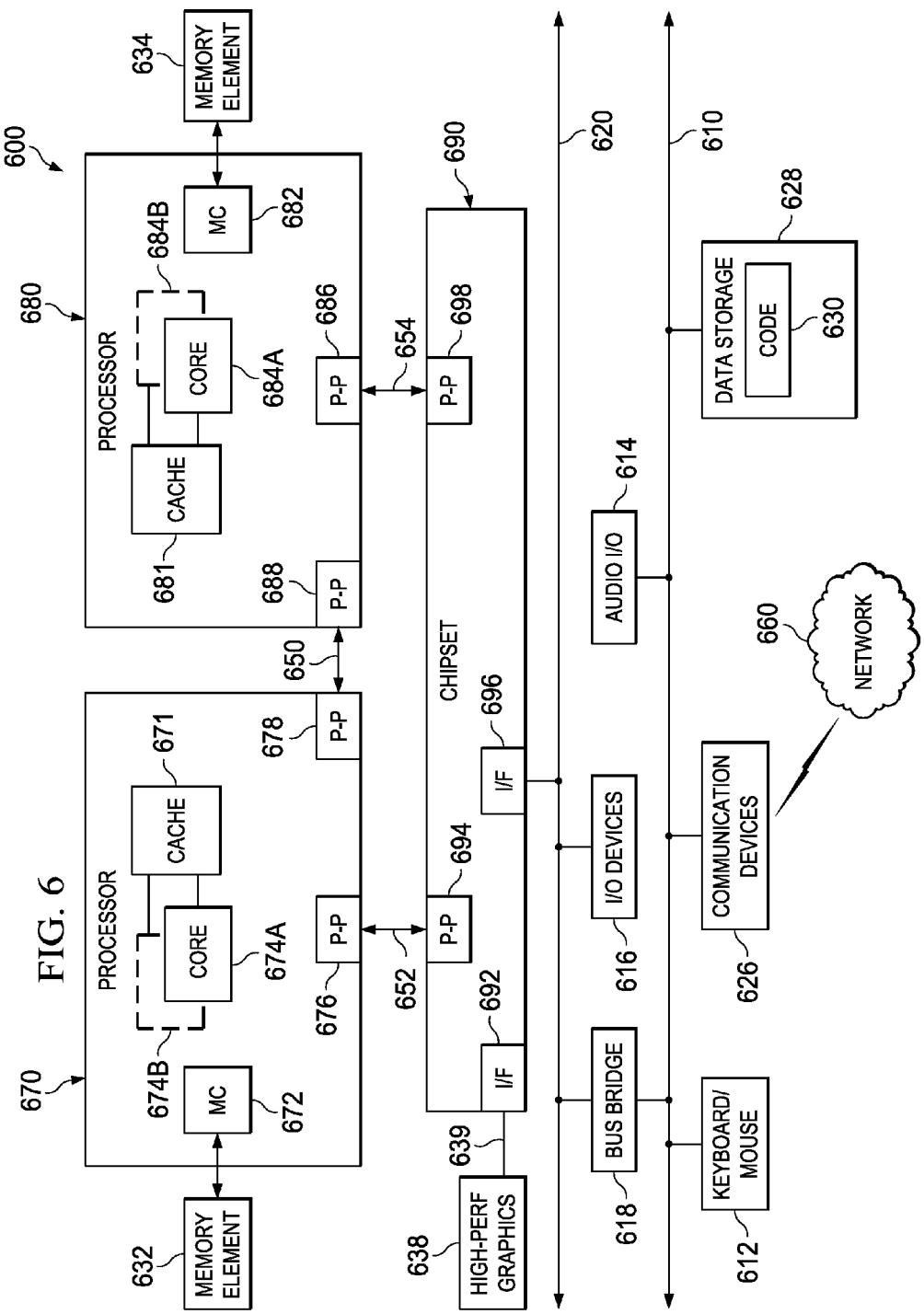
FIG. 6 is a block diagram illustrating an example computing system that is arranged in a point-to-point configuration in accordance with an embodiment.

FIG. 6 illustrates a computing system 600 that is arranged in a point-to-point (PtP) configuration according to an embodiment. In particular, FIG. 6 shows a system where processors, memory, and input/output devices are interconnected by a number of point-to-point interfaces. Generally, one or more of the network elements of communication system 10 may be configured in the same or similar manner as computing system 600.

As illustrated in FIG. 6, system 600 may include several processors, of which only two, processors 670 and 680, are shown for clarity. While two processors 670 and 680 are shown, it is to be understood that an embodiment of system 600 may also include only one such processor. Processors 670 and 680 may each include a set of cores (i.e., processor cores 674A and 674B and processor cores 684A and 684B) to execute multiple threads of a program. The cores may be configured to execute instruction code in a manner similar to that discussed above with reference to FIGS. 1-5. Each processor 670, 680 may include at least one shared cache 671, 681. Shared caches 671, 681 may store data (e.g., instructions) that are utilized by one or more components of processors 670, 680, such as processor cores 674 and 684.

Processors 670 and 680 may also each include integrated memory controller logic (MC) 672 and 682 to communicate with memory elements 632 and 634. Memory elements 632 and/or 634 may store various data used by processors 670 and 680. In alternative embodiments, memory controller logic 672 and 682 may be discrete logic separate from processors 670 and 680.

Processors 670 and 680 may be any type of processor and may exchange data via a point-to-point (PtP) interface 650 using point-to-point interface circuits 678 and 688, respectively. Processors 670 and 680 may each exchange data with a chipset 690 via individual point-to-point interfaces 652 and 654 using point-to-point interface circuits 676, 686, 694, and 698. Chipset 690 may also exchange data with a high-performance graphics circuit 638 via a high-performance graphics interface 639, using an interface circuit 692, which could be a PtP interface circuit. In alternative embodiments, any or all of the PtP links illustrated in FIG. 6 could be implemented as a multi-drop bus rather than a PtP link.

Chipset 690 may be in communication with a bus 620 via an interface circuit 696. Bus 620 may have one or more devices that communicate over it, such as a bus bridge 618 and I/O devices 616. Via a bus 610, bus bridge 618 may be in communication with other devices such as a keyboard/mouse 612 (or other input devices such as a touch screen, trackball, etc.), communication devices 626 (such as modems, network interface devices, or other types of communication devices that may communicate through a computer network 660), audio I/O devices 614, and/or a data storage device 628. Data storage device 628 may store code 630, which may be executed by processors 670 and/or 680. In alternative embodiments, any portions of the bus architectures could be implemented with one or more PtP links.

The computer system depicted in FIG. 6 is a schematic illustration of an embodiment of a computing system that may be utilized to implement various embodiments discussed herein. It will be appreciated that various components of the system depicted in FIG. 6 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 7:
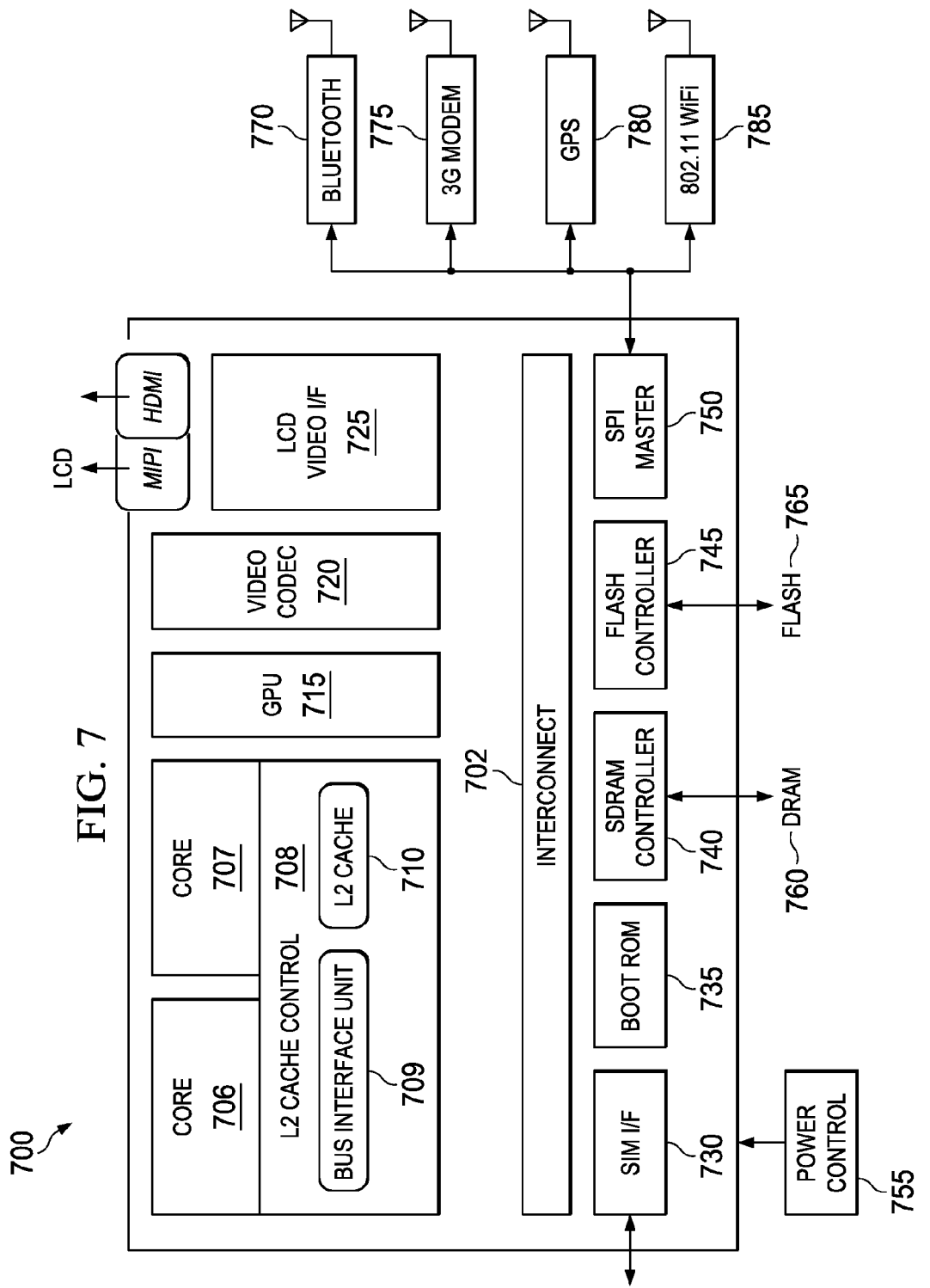
FIG. 7 is a simplified block diagram associated with an example ARM ecosystem system on chip (SOC) of the present disclosure.

Turning to FIG. 7, FIG. 7 is a simplified block diagram associated with an example ARM ecosystem SOC 700 of the present disclosure. At least one example implementation of the present disclosure can include the determination of a reputation through network characteristics features discussed herein and an ARM component. For example, the example of FIG. 7 can be associated with any ARM core (e.g., A-7, A-15, etc.). Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc.

In this example of FIG. 7, ARM ecosystem SOC 700 may include multiple cores 706-707, an L2 cache control 708, a bus interface unit 709, an L2 cache 710, a graphics processing unit (GPU) 715, an interconnect 702, a video codec 720, and a liquid crystal display (LCD) I/F 725, which may be associated with mobile industry processor interface (MIPI)/high-definition multimedia interface (HDMI) links that couple to an LCD.

ARM ecosystem SOC 700 may also include a subscriber identity module (SIM) I/F 730, a boot read-only memory (ROM) 735, a synchronous dynamic random access memory (SDRAM) controller 740, a flash controller 745, a serial peripheral interface (SPI) master 750, a suitable power control 755, a dynamic RAM (DRAM) 760, and flash 765. In addition, one or more example embodiments include one or more communication capabilities, interfaces, and features such as instances of Bluetooth™ 770, a 3G modem 775, a global positioning system (GPS) 780, and an 802.11 Wi-Fi 785.

In operation, the example of FIG. 7 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 8:
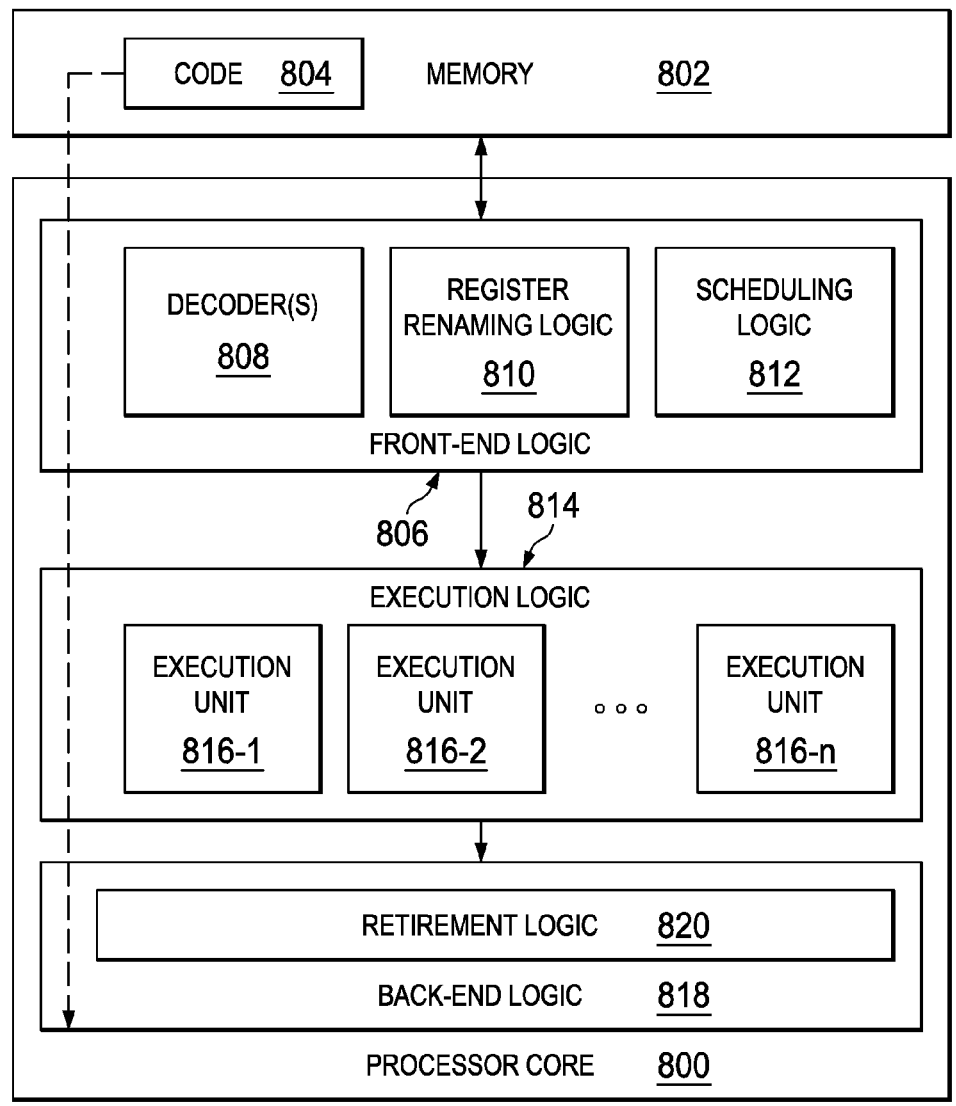
FIG. 8 is a block diagram illustrating an example processor core in accordance with an embodiment.

FIG. 8 illustrates a processor core 800 according to an embodiment. Processor core 800 may be the core for any type of processor, such as a micro-processor, an embedded processor, a digital signal processor (DSP), a network processor, or other device to execute code. Although only one processor core 800 is illustrated in FIG. 8, a processor may alternatively include more than one of the processor core 800 illustrated in FIG. 8. For example, processor core 800 represents one example embodiment of processors cores 674a, 674b, 684a, and 684b shown and described with reference to processors 670 and 680 of FIG. 6. Processor core 800 may be a single-threaded core or, for at least one embodiment, processor core 800 may be multithreaded in that it may include more than one hardware thread context (or "logical processor") per core.

FIG. 8 also illustrates a memory 802 coupled to processor core 800 in accordance with an embodiment. Memory 802 may be any of a wide variety of memories (including various layers of memory hierarchy) as are known or otherwise available to those of skill in the art. Memory 802 may include code 804, which may be one or more instructions, to be executed by processor core 800. Processor core 800 can follow a program sequence of instructions indicated by code 804. Each instruction enters a front-end logic 806 and is processed by one or more decoders 808. The decoder may generate, as its output, a micro operation such as a fixed width micro operation in a predefined format, or may generate other instructions, microinstructions, or control signals that reflect the original code instruction. Front-end logic 806 also includes register renaming logic 810 and scheduling logic 812, which generally allocate resources and queue the operation corresponding to the instruction for execution.

Processor core 800 can also include execution logic 814 having a set of execution units 816-1 through 816-N. Some embodiments may include a number of execution units dedicated to specific functions or sets of functions. Other embodiments may include only one execution unit or one execution unit that can perform a particular function. Execution logic 814 performs the operations specified by code instructions.

After completion of execution of the operations specified by the code instructions, back-end logic 818 can retire the instructions of code 804. In one embodiment, processor core 800 allows out of order execution but requires in order retirement of instructions. Retirement logic 820 may take a variety of known forms (e.g., re-order buffers or the like). In this manner, processor core 800 is transformed during execution of code 804, at least in terms of the output generated by the decoder, hardware registers and tables utilized by register renaming logic 810, and any registers (not shown) modified by execution logic 814.

Although not illustrated in FIG. 8, a processor may include other elements on a chip with processor core 800, at least some of which were shown and described herein with reference to FIG. 6. For example, as shown in FIG. 6, a processor may include memory control logic along with processor core 800. The processor may include I/O control logic and/or may include I/O control logic integrated with memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication system 10 and its teachings are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the operations in the preceding flow diagrams (i.e., FIGS. 3-5) illustrate only some of the possible correlating scenarios and patterns that may be executed by, or within, communication system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although communication system 100 has been illustrated with reference to particular elements and operations that facilitate the communication process, these elements and operations may be replaced by any suitable architecture, protocols, and/or processes that achieve the intended functionality of communication system 100

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Other Notes and Examples

Example C1 is at least one machine readable storage medium having one or more instructions that when executed by at least one processor, cause the at least one processor to monitor network traffic to and from a device, compare the monitored network traffic to characteristics of the device to determine if the monitored traffic is outside the characteristics of the device, and assign an untrusted reputation to the device if the monitored traffic is outside the characteristics of the device.

In Example C2, the subject matter of Example C1 can optionally include where the device characteristics are created from previous network traffic to and from the device.

In Example C3, the subject matter of any one of Examples C1-C2 can optionally include where the device characteristics are at least partially based on other device characteristics of similar devices.

In Example C4, the subject matter of any one of Examples C1-C3 can optionally include where the device characteristics are obtained from an original equipment manufacturer.

In Example C5, the subject matter of any one of Examples C1-C4 can optionally include where the one or more instructions that when executed by the at least one processor, further cause the processor to monitor network traffic to and from a plurality of devices on a local network, compare the monitored network traffic to and from each of the plurality of devices to characteristics of each of the plurality of devices, determine if the monitored network traffic to and from a specific device is outside characteristics of the specific device, and initiate remedial action if the monitored traffic is outside the characteristics of the specific device.

In Example C6, the subject matter of any one of Example C1-C5 can optionally include where the characteristics at least partially include uploading sensitive data.

In Example C7, the subject matter of any one of Examples C1-C6 can optionally include where the remedial action includes restricting network access for the device.

In Example C8, the subject matter of any one of Examples C1-C7 can optionally include where the remedial action includes scanning the device for malware.

In Example A1, an electronic device can include a behavior reputation module, where the behavior reputation module is configured to monitor network traffic to and from a device, compare the monitored network traffic to characteristics of the device to determine if the monitored traffic is outside the characteristics of the device, and assign an untrusted reputation to the device if the monitored traffic is outside the characteristics of the device.

In Example, A2, the subject matter of Example A1 can optionally include where the device characteristics are created from previous network traffic to and from the device.

In Example A3, the subject matter of any one of Examples A1-A2 can optionally include where the device characteristics are at least partially based on other device characteristics of similar devices.

In Example A4, the subject matter of any one of Examples A1-A3 can optionally include where the device characteristics are obtained from an original equipment manufacturer.

In Example A5, the subject matter of any one of Examples A1-A4 can optionally include where the behavior reputation module is further configured to monitor network traffic to and from a plurality of devices on a local network, compare the monitored network traffic to and from each of the plurality of devices to characteristics of each of the plurality of devices, determine if the monitored network traffic to and from a specific device is outside characteristics of the specific device, and initiate remedial action if the monitored traffic is outside the characteristics of the specific device.

In Example A6, the subject matter of any one of Examples A1-A5 can optionally include where the characteristics at least partially include uploading sensitive data.

In Example A7, the subject matter of any one of Examples A1-A6 can optionally include where the remedial action includes restricting network access for the device.

In Example A8, the subject matter of any one of Examples A1-A7 can optionally include where the remedial action includes scanning the device for malware.

Example M1 is a method including monitoring network traffic to and from a device, comparing the monitored network traffic to characteristics of the device to determine if the monitored traffic is outside the characteristics of the device, and assigning an untrusted reputation to the device if the monitored traffic is outside the characteristics of the device.

In Example M2, the subject matter of Example M1 can optionally include where the device characteristics are created from previous network traffic to and from the device.

In Example M3, the subject matter of any one of the Examples M1-M2 can optionally include where the device characteristics are at least partially based on other device characteristics of similar devices.

In Example M4, the subject matter of any one of the Examples M1-M3 can optionally include where the device characteristics are obtained from an original equipment manufacturer.

In Example M5, the subject matter of any one of the Examples M1-M4 can optionally include monitoring network traffic to and from a plurality of devices on a local network, comparing the monitored network traffic to and from each of the plurality of devices to characteristics of each of the plurality of devices, determining if the monitored network traffic to and from a specific device is outside the characteristics of the specific device, and initiating remedial action if the monitored traffic is outside the characteristics of the specific device.

In Example M6, the subject matter of any one of the Examples M1-M5 can optionally include where the characteristics at least partially include uploading sensitive data.

In Example M7, the subject matter of any one of the Examples M1-M6 can optionally include where the remedial action includes restricting network access for the device.

Example S1 is a system for determining a reputation through network characteristics, the system including a behavior reputation module configured for monitoring network traffic to and from a device, comparing the monitored network traffic to characteristics of the device to determine if the monitored traffic is outside the characteristics of the device, and assigning an untrusted reputation to the device if the monitored traffic is outside the characteristics of the device.

In Example S2, the subject matter of Example S1 can optionally include where the behavior reputation module is further configured for monitoring network traffic to and from a plurality of devices on a local network, comparing the monitored network traffic to and from each of the plurality of devices to characteristics of each of the plurality of devices, determining if the monitored network traffic to and from a specific device is outside the characteristics of the specific device, and taking remedial action if the monitored traffic is outside the characteristics of the specific device.

Example X1 is a machine-readable storage medium including machine-readable instructions to implement a method or realize an apparatus as in any one of the Examples A1-A8, or M1-M7. Example Y1 is an apparatus comprising means for performing of any of the Example methods M1-M7. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. At least one non-transitory computer-readable medium comprising one or more instructions that when executed by at least one processor, cause the processor to:
monitor network traffic to and from a device;
compare the monitored network traffic to characteristics of the device to determine if the monitored traffic is outside the characteristics of the device, wherein the characteristics of the device at least partially include characteristics from an original equipment manufacturer related to sending and receiving packets, and wherein the characteristics from an original equipment manufacturer are retrieved while monitoring network traffic; and
assign an untrusted reputation to the device if the monitored traffic is outside the characteristics of the device.

2. The at least one computer-readable medium of claim 1, wherein the device characteristics are created from previous network traffic to and from the device.

3. The at least one computer-readable medium of claim 1, wherein the device characteristics are at least partially based on other device characteristics of similar devices.

4. The at least one computer-readable medium of claim 1, wherein the device characteristics are obtained from the original equipment manufacturer.

5. The at least one computer-readable medium of claim 1, further comprising one or more instructions that when executed by the at least one processor, further cause the processor to:
monitor network traffic to and from a plurality of devices on a local network;
compare the monitored network traffic to and from each of the plurality of devices to characteristics of each of the plurality of devices;
determine if the monitored network traffic to and from a specific device is outside characteristics of the specific device; and
initiate remedial action if the monitored traffic is outside the characteristics of the specific device.

6. The at least one computer-readable medium of claim 1, wherein the characteristics at least partially include uploading sensitive data.

7. The at least one computer-readable medium of claim 1, wherein the remedial action includes restricting network access for the device.

8. The at least one computer-readable medium of claim 1, wherein the remedial action includes scanning the device for malware.

9. An apparatus comprising:
a hardware processor; and
a behavior reputation engine configured to:
monitor network traffic to and from a device;
compare the monitored network traffic to characteristics of the device to determine if the monitored traffic is outside the characteristics of the device, wherein the characteristics of the device at least partially include characteristics from an original equipment manufacturer related to sending and receiving packets, and wherein the characteristics from an original equipment manufacturer are retrieved while monitoring network traffic; and
assign an untrusted reputation to the device if the monitored traffic is outside the characteristics of the device.

10. The apparatus of claim 9, wherein the device characteristics are created from previous network traffic to and from the device.

11. The apparatus of claim 9, wherein the device characteristics are at least partially based on other device characteristics of similar devices.

12. The apparatus of claim 9, wherein the device characteristics are obtained from the original equipment manufacturer.

13. The apparatus of claim 9, wherein the behavior reputation module is further configured to:
monitor network traffic to and from a plurality of devices on a local network;
compare the monitored network traffic to and from each of the plurality of devices to characteristics of each of the plurality of devices;
determine if the monitored network traffic to and from a specific device is outside characteristics of the specific device; and
initiate remedial action if the monitored traffic is outside the characteristics of the specific device.

14. The apparatus of claim 9, wherein the characteristics at least partially include uploading sensitive data.

15. The apparatus of claim 9, wherein the remedial action includes restricting network access for the device.

16. The apparatus of claim 9, wherein the remedial action includes scanning the device for malware.

17. A system for determining a reputation through network characteristics, the system comprising:
a hardware processor; and
a behavior reputation engine configured for:
monitoring network traffic to and from a device;
comparing the monitored network traffic to characteristics of the device to determine if the monitored traffic is outside the characteristics of the device, wherein the characteristics of the device at least partially include characteristics from an original equipment manufacturer related to sending and receiving packets, and wherein the characteristics from an original equipment manufacturer are retrieved while monitoring network traffic; and
assigning an untrusted reputation to the device if the monitored traffic is outside the characteristics of the device.

18. The system of claim 17, wherein the system is further configured for:
monitoring network traffic to and from a plurality of devices on a local network;
comparing the monitored network traffic to and from each of the plurality of devices to characteristics of each of the plurality of devices;
determining if the monitored network traffic to and from a specific device is outside characteristics of the specific device; and
initiating remedial action if the monitored traffic is outside the characteristics of the specific device.

* * * * *